United States Patent

[11] 3,573,465

| [72] | Inventors | Bernard G. King<br>Rumson;<br>Richard P. Riesz, Chatham, N.J. |
|---|---|---|
| [21] | Appl. No. | 780,346 |
| [22] | Filed | Dec. 2, 1968 |
| [45] | Patented | Apr. 6, 1971 |
| [73] | Assignee | Bell Telephone Laboratories, Inc.<br>Murray Hill, Berkeley Heights, N.J. |

[54] GUNN EFFECT DRIVER FOR OPTICAL MODULATORS
8 Claims, 4 Drawing Figs.

[52] U.S. Cl............................................. 250/199,
331/94.5, 331/107G, 332/7.51, 350/150
[51] Int. Cl............................................. H04b 9/00
[50] Field of Search............................................. 250/199;
330/4, 4.3, 4.5; 307/88.3; 331/94.5, 107 (G);
332/7.51; 350/150, 151, 160, 161

[56] References Cited
UNITED STATES PATENTS
3,440,425   4/1969   Hutson et al.................. 331/107(G)
3,475,078   10/1969   Gordon ........................ 250/199

*Primary Examiner*—Robert L. Griffin
*Assistant Examiner*—Albert J. Mayer
*Attorneys*—R. J. Guenther and Kenneth B. Hamlin ABSTRACT: A Gunn effect device is utilized to provide pulses of the high amplitude and frequency needed to drive an optical modulator, such as a lithium tantalate crystal for efficiently utilizing the bandwidth of light transmitted through the modulator. An acoustically absorbent mounting is provided for the modulator to suppress acoustical ringing resulting from piezoelectric effects in the modulator. The modulation system is initially aligned by simulating at a comparatively low frequency the drive amplitudes in order to establish a maximum condition of modulation in the optical part of the system. Thereafter, signals at the Gunn effect device output rate are supplied for controlling the modulator. Information-representative signals coupled to the modulator through the Gunn effect device are synchronized with the optical system utilizing the modulator.

Patented April 6, 1971

INVENTORS B. G. KING
R. P. RIESZ
BY

*Charles Scott Phelan*
ATTORNEY

GUNN EFFECT DRIVER FOR OPTICAL MODULATORS

BACKGROUND OF THE INVENTION

1. Field of the Invention

This invention relates to optical modulating systems and involves in particular the use of a semiconductor driver in such a system for operating it at high frequencies.

2. Description of the Prior Art

Electro-optical modulators such as lithium tantalate or lithium niobate crystals are known in the art for operating in response to an applied electric field to rotate the polarization orientation of visible electromagnetic radiation transmitted therethrough in a direction which is perpendicular to the direction of the electric field. It is also known that the applied modulator voltage which produces the electric field initiates piezoelectric action in the modulator crystal when the voltage changes and thereby sets up acoustical ringing in the crystal. The ringing vibrations produce spurious polarization rotations which must be accommodated in some fashion in order to prevent intersymbol interference in the modulated signal. One method for suppressing such ringing is taught in the copending application of M. R. Biazzo, B. G. King, and W. C. G. Ortel Ser. No. 780,347 filed Dec. 2, 1968, entitled "Acoustically Absorbent Mounting Method and Apparatus for Optical Modulator" and filed on even date herewith.

However, another limiting factor for electro-optical modulators has been drive circuits for supplying the indicated modulating voltage. It is usually necessary in electro-optical modulators to supply a large voltage in order to attain significant modulation. The polarization rotation characteristic of such a modulator typically resembles a raised cosine curve when plotting rotation against applied voltage. Thus, the characteristic has nonlinear portions including parts of zero slope, one being at zero applied voltage, interspersed with substantially linear portions of maximum slope. Significant voltages, i.e., of the order of 40 volts, are required to bias the modulator for operation in one of its linear ranges of maximum slope. Furthermore, bias variations of 1 or 2 volts are required in the prior art to secure comparatively small modulation percentages, e.g., 2 percent. Conventional solid state or electronic tube circuit techniques are not, in the present state of the art, capable of driving a modulation voltage through such swings at frequencies in the gigahertz range if it is required that such circuits be available at reasonable cost and in any reasonable size. Those skilled in the art will recognize that frequencies in the gigahertz range are desirable for realizing economical utilization of the broadband capability of information modulation on electromagnetic radiation in the light frequency range. However, over the years that electro-optical modulators of the types noted have been available it has not been possible to operate them above a few hundred megahertz with useful information-controlled digital modulation.

Another difficulty encountered in providing bias to electro-optical modulators in the gigahertz frequency range resides in the bias current levels required. Thus, even the refined modulator mounting taught in the aforementioned Biazzo et al. application has low but significant capacitance. Drive currents of the order of an ampere are required to charge the capacitance fast enough to realize the necessary bias voltages at frequencies in the gigahertz range.

It is also known in the art that a gallium arsenide crystal operated in the so-called Gunn-effect mode can be utilized as an electro-optical modulator. Such a modulator is taught in the copending application of E. I. Gordon, Ser. No. 507,732, now U.S. Pat. No. 3,475,078, filed Nov. 15, 1965. However, gallium arsenide is not useful for the shorter visible wavelengths and it also has a much lower electro-optical coefficient than do other known modulators such as those comprising the mentioned lithium compound crystals. Accordingly, only modulations of only about 2 percent have been attained with such devices.

It is, therefore, one object of the present invention to drive an electro-optical modulator at frequencies which are compatible with the efficient utilization of the bandwidth of electromagnetic radiation in the light frequency range.

It is another object to produce large amplitude information variable voltages at high frequencies for efficiently driving electro-optical modulators.

A further object is to increase the operating speed of electro-optical modulators.

Still another object is to achieve a smaller and simpler driver than has been heretofore available for electro-optical modulators.

SUMMARY OF THE INVENTION

The aforementioned and other objects of the invention are realized in an illustrative embodiment in which an electro-optical modulator is connected to have an electric field applied thereacross by a semiconductor device which produces, in response to appropriate bias, high intensity electric field domains which reoccur at a frequency which is at least partly a function of the length of the device.

It is one feature of the invention that information controlled logic is utilized to control nucleation of selected electric field domains for causing the modulator to operate in accordance with binary coded information signals.

Another feature is that the semiconductor device may be biased by a low frequency pulsed bias source of low-duty cycle to reduce thermal effects in applications of the device which may produce spurious modulation that would interfere with the desired information.

It is a further feature that an output of a pulsed light source which is typically utilized in the prior art for driving electro-optical modulators is used to synchronize an information input source which controls operation of the semiconductor device.

Still another feature is that a substitution alignment method is employed for optimizing an optical system utilized for supplying light to the modulator to secure maximum percentage modulation for the bias signal levels to be applied to the modulator from the semiconductor device.

A still further feature of the invention is that a plurality of semiconductor drivers of the type outlined are readily operable on a time sharing basis from a single information input source for achieving further advantages such as increasing the information capacity of the system or reducing thermal stresses on the solid state crystals employed.

BRIEF DESCRIPTION OF THE DRAWING

A more complete understanding of the invention may be obtained from a consideration of the following detailed description in connection with the appended claims and the attached drawing in which:

DETAILED DESCRIPTION

Figure 1:
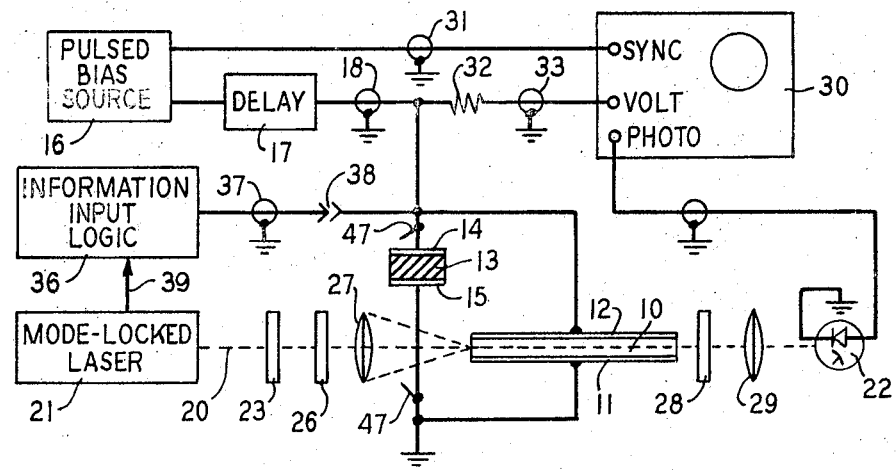
FIG. 1 is a diagram partially in schematic form and partially in block and line diagram form of a modulation system in accordance with one aspect of the invention.

In FIG. 1 an electro-optical modulator 10 has electric signals applied thereacross through contacts 11 and 12 which extend over substantially the full extent of opposed modulator faces in one embodiment. Such a modulator has significant capacitance but it is easily driven by the structures to be described. The electric signals are provided by a gallium arsenide crystal 13 which is connected in parallel with the modulator 10 and which receives bias voltages from a pulsed bias source 16 through an electric delay circuit 17 and a coaxial connecting circuit 18. The crystal 13 is operated as a so-called Gunn-effect device for producing trains of high-frequency pulses. In such devices a voltage is applied across the crystal in excess of a predetermined threshold to cause the nucleation of successive high intensity electric field domains adjacent to the cathode contact 14 and for transmission through the crystal to the anode contact 15. At the anode each domain is extinguished and thereafter another is nucleated at the cathode.

In the absence of an electric field domain, the crystal 13 presents a comparatively low resistance in the electric circuit from the connecting circuit 18 to ground, thereby shunting the modulator 10. However, when a domain is present, the crystal 13 presents a comparatively high resistance in the aforementioned circuit and thereby permits a significant increment of current to be diverted to the modulator 10. Thus, in the presence of a domain, the voltage and current applied to the modulator 10 are greatly increased. Such increased current is of sufficient amplitude to charge the modulator capacitance completely in a time interval that is much shorter than the period of domain recurrence.

Modulator 10 is preferably an elongated crystal of lithium tantalate mounted on a glass substrate 19 in accordance with the teachings of the aforementioned Biazzo et al. application. For example, a crystal 12.5 millimeters long and having a cross section 0.25 millimeter square operated well. Bias voltages of the order of 40 volts are applied transversely to modulator 10 to rotate the polarization orientation of a light beam 20 which is supplied by a light source 21 that is advantageously a mode locked helium neon laser. Such polarization rotation operates in conjunction with the associated optical system of the modulator for effecting intensity modulation of the illumination reaching a fast photodetector 22. The latter detector is advantageously of a type such as that taught by M. V. Schneider in an article entitled "Schottky Barrier Photodiodes with Antireflection Coating," Bell System Technical Journal, Vol. XLV, No. 9 Nov. 1966, pp. 1611—1638. Diodes of that type are capable of operating in the gigahertz frequency range contemplated for the present invention.

The laser light source 21, in the particular embodiment illustrated, supplies a train of pulses of approximately 1 nanosecond duration at a 100-megahertz repetition rate. These pulses are transmitted through an associated optical system for operating the modulator 10. In that optical system a quarter-wave plate 23 operates in a well-known manner to rotate the polarization orientation of the beam 20 into substantial alignment with polarization axis of the modulator 10. A half-wave plate 26 accomplishes a further small rotation to compensate for known rotational distortion effects in the modulator 10. The beam 20 is then transmitted through a condensing lens 27 which focuses the beam on the near-end face of the modulator 10.

Upon emerging from the modulator 10 the beam 20 encounters an analyzer 28 which is oriented to attenuate severely all light transmitted through modulator 10 in the absence of applied bias signals. The analyzer 28 is further oriented to attenuate least that portion of the beam 20 which has been subjected to the maximum possible rotation for the maximum anticipated bias that will be applied to modulator 10. A further condensing lens 29 focuses the resulting intensity modulated beam on the photodetector 22.

Detector 22 is coupled to a utilization circuit which, in FIG. 1, is the "photo" input deflection circuit of a sampling oscilloscope 30. A synchronizing signal for the oscilloscope is provided by a circuit 31 from an output of the pulsed biased source 16. A resistor 32 couples the output of the delay circuit 17 to the "volt" deflection input of the oscilloscope 30. The delay of circuit 17 permits the synchronizing signal in circuit 31 to initiate oscilloscope action before other signals are applied to the oscilloscope. This arrangement of connections permits dual traces indicating the voltage across the combination of crystal 13 and modulator 10 and indicating the resulting current in the photodetector 22.

Figure 2:
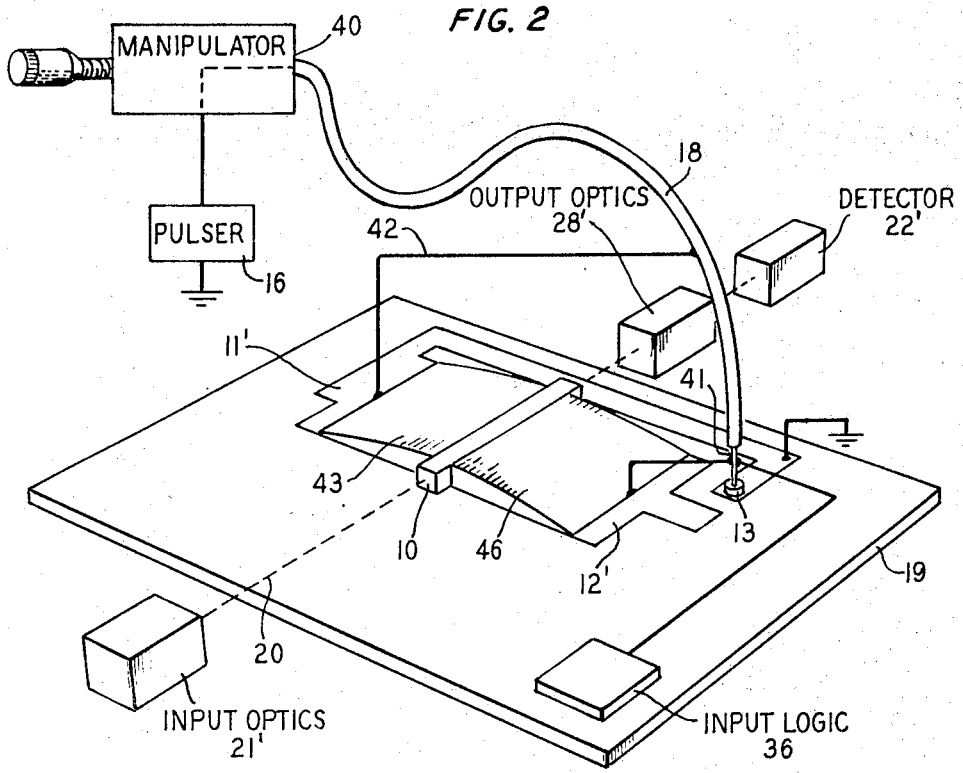
FIG. 2 is a simplified perspective view of one embodiment of the system illustrated in FIG. 1.

The output of bias source 16 is advantageously applied at a low repetition rate to avoid undesirable modulation interference resulting from thermal effects in either the crystal 13 or the modulator 10. In one embodiment 100-nanosecond pulses of essentially rectangular configuration and with approximately a 40-volt amplitude were applied at a 60-hertz-repetition rate to the crystal 13. The crystal 13 responds to such pulses for producing oscillatory pulses of a much higher frequency and about 3-volts amplitude for the duration of each such bias pulse. In one circuit the crystal 13 has a 25 micrometer length and a 125-micrometer dimension in each of the other two directions for an essentially cubic crystal. The pulses applied from that crystal 13 to modulator 10 were at a repetition rate of approximately 2 gigahertz. However, it is known in the art that crystals operating in the Gunn-effect mode can be tuned over a comparatively broadband by the association of external tuning means therewith. In the frequency ranges here contemplated this tuning is readily effected by lead lengths and configurations. A configuration essentially as shown in FIG. 2 was utilized to produce the 2-gigahertz repetition rate. Modulation of about 20 percent was realized with this type of drive on the modulator 10.

Figure 3A:
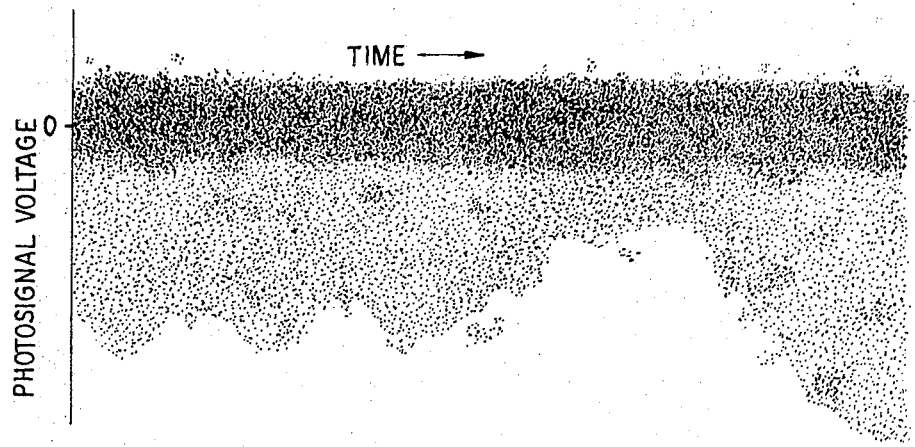
FIGS. 3A and 3B are signal representations illustrating operation of the invention.

It will be understood by those skilled in the art that the modulation system described thus far is unsynchronized; and it is for that reason, and the high modulation frequency to be observed, that the sampling oscilloscope 30 was utilized. A camera, not shown, was used to make a continuous photographic exposure of the screen of the oscilloscope during repeated traces of the sampling sweep. The resulting photograph demonstrated clearly the 20 percent modulation at the 2-gigahertz rate as shown in the representation of such a photograph in FIGS. 3A and 3B. The latter two figures are drawn to the same time scale but different voltage scales. FIG. 3A shows the photosignal voltage applied to oscilloscope 30 through the photodiode 22 and represents the cumulative behavior of peaks of laser pulses from source 21 as received at diode 22 and occurring at a much higher frequency than either of the source 16 outputs. That behavior was produced in response to pulses from source 16, and a trace of a corresponding terminal part of such a pulse is shown in FIG. 3B with the Gunn-effect pulse train superimposed thereon as it appears through the connection 33 in FIG. 1.

Figure 3B:
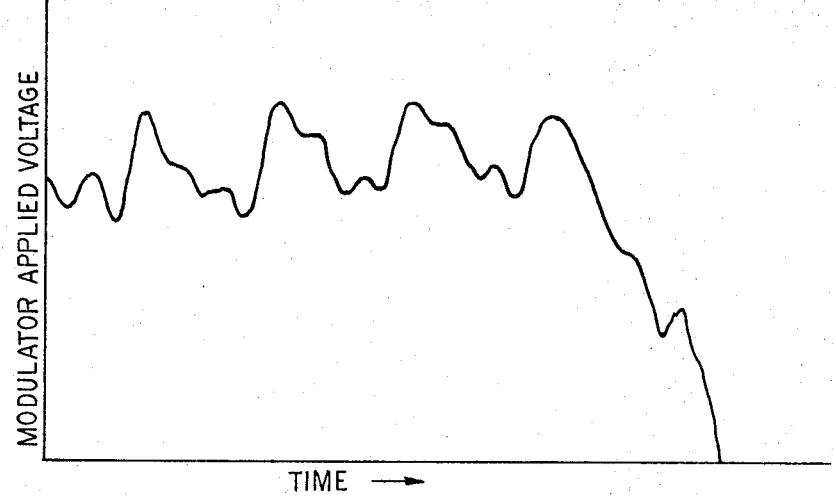

The pulse in FIG. 3B was roughly 40 volts in magnitude with Gunn-effect voltage swings of about 3 volts at a 2-gigahertz-repetition rate. Corresponding 2-gigahertz undulations are apparent in the envelope of the samples shown in FIG. 3A. The peak excursion of the representation in FIG. 3A during the FIG. 3B pulse was about 40 millivolts and the minimum envelope excursion was about 32 millivolts for about 20 percent modulation. Thus, output pulses from crystal 13 are capable of modulating the very narrow light pulses provided by source 21. The large envelope excursion in FIG. 3A following the end of the FIG. 3B pulse is simply the result of the low-frequency light modulation upon removal of the source 16 drive pulse.

In a communication system it is, of course, necessary to operate the modulator and the modulating information source in synchronism. To this end an information input logic circuit 36 supplies binary coded information signals by way of a coaxial circuit 37 and a selectable connector 38 to the crystal 13 and the modulator 10. The logic circuit 36 is clocked by the output of the laser source 21 through an arrangement schematically represented by a connection 39. Such a synchronizing arrangement would advantageously comprise, for example, a mirror system for diverting a portion of the laser output to a photodetector for producing an electrical signal to control electric circuits in the logic circuit 36. Another, and perhaps faster, synchronizing arrangement is that taught in the copending application of R. P. Riesz Ser. No. 776,220, filed Nov. 15, 1968, and entitled "Optically Controlled Phase Adjustment for Electrical Signals," wherein a gallium arsenide crystal is operated as a phase switch for synchronizing high-frequency pulse signals.

One example of an implementation of the logic circuit 36 is the Gunn-effect adder shown in FIG. 1 of the article "Some Basic Logic Circuits Employing Gunn Effect Devices" by H. Hartnagel in Solid-State Electronics, Vol. 11, No. 5, May 1968, p. 569. The output of the final comparator in such an adder is coupled through the circuit 37 to the crystal 13. Synchronization is achieved, for example, by causing the clocking connection 39 to control an input to a Gunn-effect AND gate of the type shown by Hartnagel and arranged in input connections to the adder.

When the input logic circuit 36 is utilized in conjunction with the pulsed bias source 16, the amplitude of output pulses from the latter source is dropped to a level which is below the threshold for the nucleation of domains of crystal 13, but which is close enough to that level so that additional current provided by input logic 36 to the crystal 13 increases the voltage developed thereacross sufficiently to exceed the threshold for the formation of domains.

As previously noted, FIG. 2 represents a simplified perspective view of one form of the system described in connection with FIG. 1. In FIG. 2 circuit elements corresponding to those in FIG. 1 are indicated by similar reference characters. In this case the coaxial circuit 18 is formed in a rigid structure which is positioned by a micromanipulator 40 to place the inner conductor 41 of the circuit 18 in pressure contact with the crystal 13. The latter crystal and the modulator 10 are electrically connected to thin film contacts 11' and 12' which are deposited on a glass substrate 19. In the illustration of FIG. 2 the contact 11' represents the ground connection and is coupled by a lead 42 to the outer conductor of coaxial circuit 18. Massive solder deposits 43 and 46 complete electrical connection from the contacts 11' and 12' to substantially the full extent of opposed faces of the modulator 10. The input optics block 21' includes the light source 21 and associated optical elements of FIG. 1 for focusing the beam 20 in appropriate orientation on the end face of modulator 10. Similarly, the output optics 28' include the elements of FIG. 1 for converting rotational modulation to intensity modulation and focusing the resulting intensity modulated beam on the detector 22'. Input logic 36 is connected to the center conductor 41 and advantageously mounted on the same substrate 19.

Since the degree of modulation by the electro-optical modulators of the type herein described depends at least in part upon the nominal operating point to which the modulator is biased, it is desirable to optimize the modulator bias with respect to the optical system associated with the modulator. An alignment procedure has been devised for achieving such optimization with a minimum of repeated interdependent adjustments. The first step in this procedure is to initiate operation and determine the amplitude of the pulsed direct current bias which is applied to the crystal 13 from the source 16 and to determine the magnitude of the Gunn-effect oscillations which are superimposed thereon by the crystal 13 when it operates in the Gunn-effect mode. Next the crystal 13 is removed from the circuit and a similar bias arrangement is substituted with a comparatively low-frequency source being provided for superimposing a pulse train of lower frequency on the basic pulsed direct current bias from source 16. Under these conditions, modulator 10 is operating at a sufficiently low frequency, e.g., 1 megahertz, that a real-time display of each drive pulse interval and the corresponding modulation can be presented on the screen of the oscilloscope 30. Accordingly, the optical system associated with modulator 10 can be readily adjusted to be sure that, for the indicated bias magnitude, the operating point of the modulator is in an essentially linear part of its rotation versus voltage characteristic and that the optical system elements are adjusted for the optimum polarization rotation needed for maximum modulation. Preferably such linear portion is a part with maximum slope. The latter condition is observed on the oscilloscope where individual information bits at the aforementioned 1 megahertz rate are superimposed on the screen. The optical system is adjusted for maximum difference between maximum and minimum pulse amplitudes provided by detector 22. Now the crystal 13 is restored to the circuit in lieu of the substituted 1-megahertz bias source and normal electro-optic modulation proceeds as previously described.

In information-controlled systems for high bit rate operation, e.g., a rate higher than the output pulse repetition rate of source 21, plural drive crystals and light sources can be provided to time share modulator 10. Such a multiplex arrangement is schematically indicated in FIG. 1 by the short diagonal lines 47 connected to the leads of contacts 14 and 15 of the crystal 13. The additional crystals 13 drive the modulator 10 in turn in recurring sequence, and outputs to the additional light sources are multiplexed to apply to modulator 10 a total light pulse train with a pulse repetition rate corresponding to the high-bit rate.

It is apparent from FIG. 2 and the previously mentioned crystal and modulator dimensions that a system of small proportions is disclosed. Furthermore, the assembly of the system is noncritical as compared to assembly problems for using prior art solid state or vacuum tube circuits; but operation at frequencies and percentages of modulation much higher than were heretofore possible have been realized.

Although the present invention has been described in connection with particular embodiments thereof, it is to be understood that additional embodiments and modifications which will be obvious to those skilled in the art are included within the spirit and scope of the invention.

We claim:

1. In combination:
an electro-optical modulator which is responsive to an applied electric pulse for altering the polarization orientation of electromagnetic radiation transmitted through the modulator;
a semiconductor device electrically connected to supply said pulses to said modulator, said device being responsive to an applied voltage in excess of a predetermined threshold for nucleating in said device and propagating therethrough high intensity electric field domains at a predetermined repetition rate; and
means applying to said device a voltage in excess of said threshold.

2. The combination in accordance with claim 1 in which:
means in said applying means supply said voltage on a pulsed voltage bias basis at a frequency which is much lower than said repetition rate and wherein each voltage pulse duration is much longer than the period of said repetition rate.

3. The combination in accordance with claim 1 in which:
said modulator is a semiconductor member mounted between electrical contacts extending over substantially the full extent of opposed faces thereof to form a significant circuit capacitance;
said semiconductor device is electrically connected between said electrical contacts for charging said capacitance in a time interval which is much shorter than the period of said repetition rate.

4. The combination in accordance with claim 1 in which said applying means comprises:
means biasing said device below said threshold; and
means supplying information signals at an information bit rate which is substantially said predetermined repetition rate for biasing said device over said threshold.

5. The combination in accordance with claim 4 in which:
said modulator operates on a polarization rotation basis and has predetermined high slope and lower slope parts in its voltage versus rotation characteristic;
said applying means biases said modulator to a predetermined nominal operating point in said high slope part of said rotation characteristic; and
said supply means includes means superimposing said information signals upon the device bias for establishing net bias variations around said operating point.

6. The combination in accordance with claim 4 which comprises in addition:
a light source for supplying said radiation to said modulator; and means coupling said light source and said information signal supplying means for operation in synchronism with one another.

7. The combination in accordance with claim 1 in which:

said repetition rate is at least partly a function of a dimension of said device along which said domains are propagated; and said applying means further comprises means tuning said applying means for partially determining said predetermined repetition rate.

8. The combination in accordance with claim 7 in which:

said tuning means comprises electric circuit connections for applying said voltage and configured to resonate at said repetition rate.